June 20, 1961  A. B. ECKERT, JR., ET AL  2,988,984
ARTICLE MARKING AND ORIENTING
Filed Jan. 24, 1957  5 Sheets-Sheet 3

INVENTORS
Alton B. Eckert, Jr.
Vincent M. Yaeger
BY

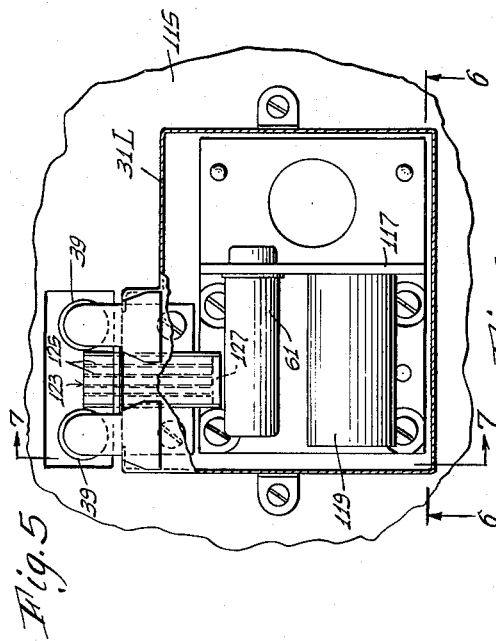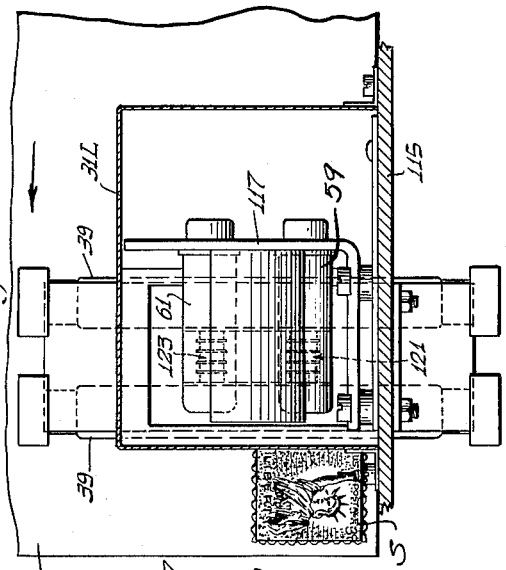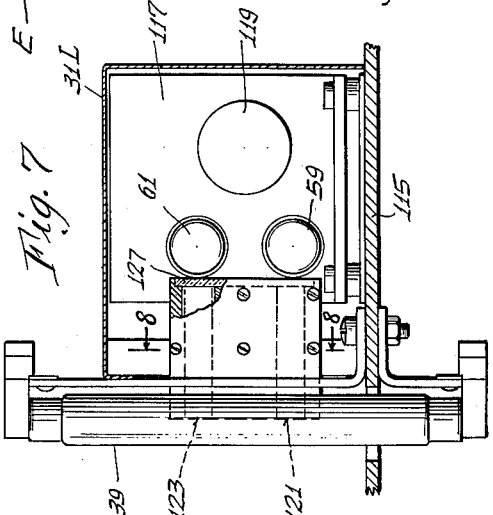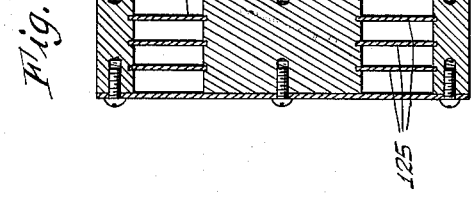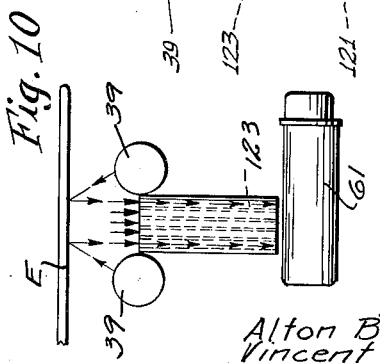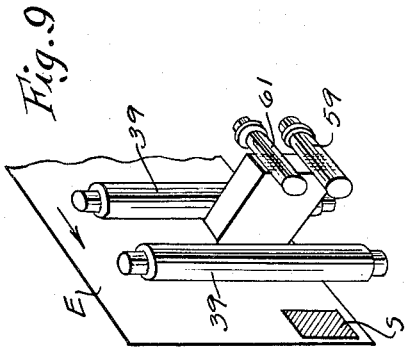

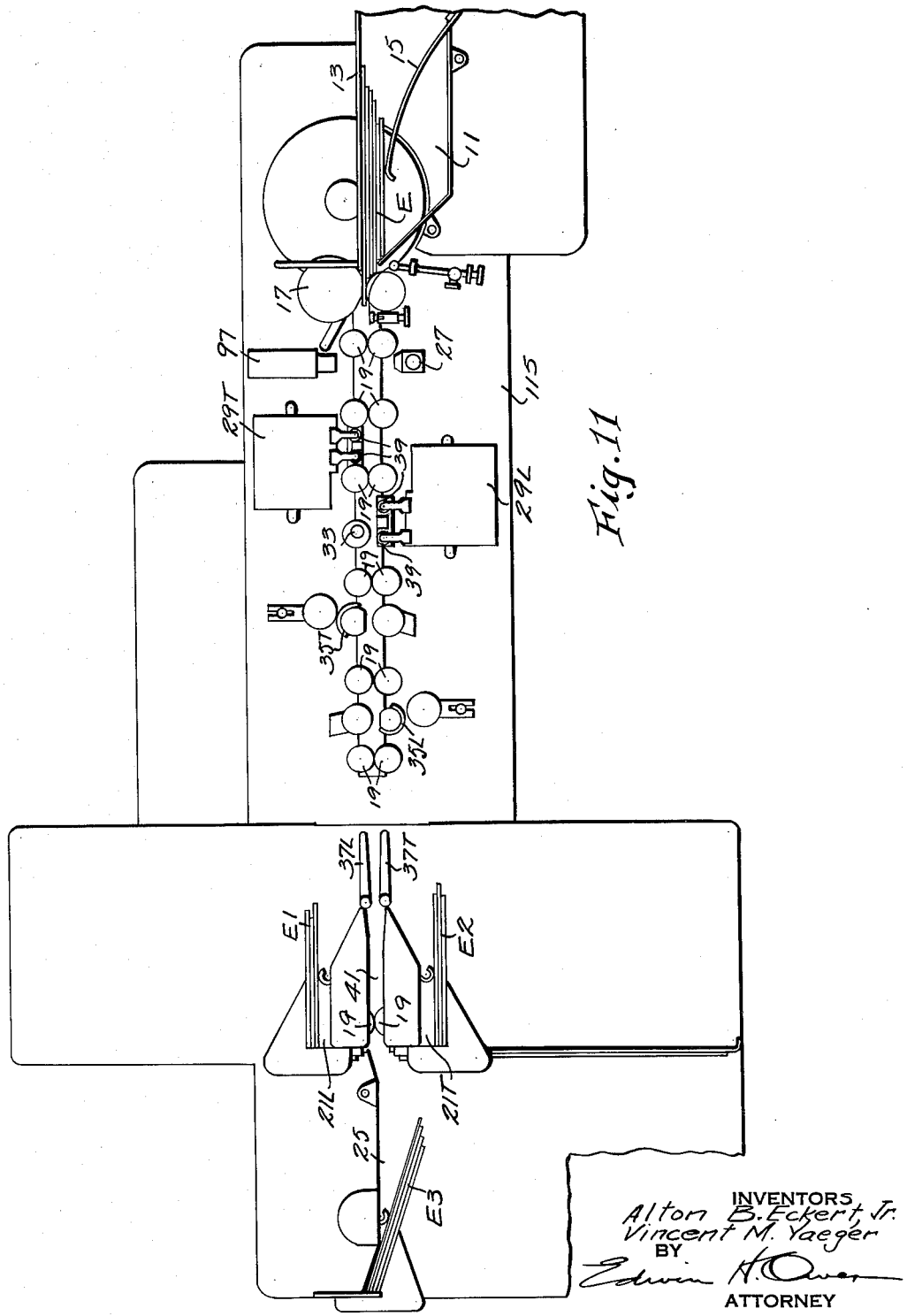

United States Patent Office 2,988,984
Patented June 20, 1961

2,988,984
ARTICLE MARKING AND ORIENTING
Alton B. Eckert, Jr., Port Chester, N.Y., and Vincent M. Yaeger, Stamford, Conn., assignors to Pitney-Bowes, Inc., Stamford, Conn., a corporation of Delaware
Filed Jan. 24, 1957, Ser. No. 636,032
7 Claims. (Cl. 101—2)

This invention relates to article handling and treating, and especially to the marking and/or orienting of a plurality of articles fed in succession past a predetermined point.

It is an object of the present invention to provide for handling and treating a succession of randomly oriented articles each having a designator thereon indicating a predetermined location for a mark, by automatically optically sensing the designator location, and marking each such article at said predetermined location as it passes in the succession, or sorting the articles according to their orientation as determined by the optically sensed position of the designator, or both.

It is another object of the invention to provide for handling and treating a succession of randomly oriented articles each having a designator thereon as they are fed past a predetermined location at a predetermined rate by sensing a leading or trailing end of each article, determining a scan length along the side of the article in relation to said end by fixing a scan time period having a predetermined time relation to the sensing of said end, scanning the article for said time period, and treating the article variously depending on whether or not a designator was sensed within the scan time period.

The present invention, in the form shown and described, is particularly adapted for handling randomly oriented mail to cancel the postage stamps thereon and/or sort the same into groups faced in one direction, and particularly relates to the automatic simultaneous facing of envelopes and canceling of stamps by the use of a single compact device.

It is another object of the present invention, therefore, to provide an envelope facing and/or canceling machine of the type set forth in the immediately foregoing paragraph in which there is provided separate sensing means for detecting stamps on either face of a fed envelope, a separate sensing means for detecting the leading and trailing ends of the envelope, the leading end sensing means and the stamp detecting means for one face cooperating to control operations on envelopes positioned with their stamps adjacent the lower edge on said one face, and the trailing end sensing means and detecting means for the other face cooperating to control operations on envelopes positioned with their stamps adjacent the lower edge on said other face.

The apparatus described in connection with the present invention provides a single compact device for canceling stamps on mail, and which performs a canceling operation even though the envelopes are fed thereto with random orientation, and then separately collects the canceled envelopes in accordance with their orentations, so that the output of the device is, in effect, faced and ready for other operations such as destination sorting.

It is another object of the invention to provide, in a device of the type set forth in the immediately preceding paragraph, improved sensing means for detecting stamp location, and for controlling canceling and/or sorting operations in response to sensing thereby.

A further object of the invention is the provision of an improved optical sensing device for accurately detecting the presence or absence of a foreign object such as a stamp against a substantially homogeneous reflecting background such as an envelope.

Still another object of the invention is the provision of an improved control circuit for translating the end detection and stamp signals into cancellation of the stamp at the proper time, and direction of the envelope to an appointed collection location in accordance with the stamp location thereon.

Another object of the invention is to provide for automatic letter handling in such a way that a group of optical sensing devices at an initial detection station is arranged to control the subsequent sorting of envelopes into groups of those facing in certain directions, proper cancellation of envelopes with stamps on different surfaces, or both.

Still another object of the invention is to provide in a canceling machine for optically detecting the presence on an envelope of a line of stamps too long for the cancellation mark to deface adequately, and for automatically separating such an envelope and feeding it to a separate reject storage point to await separate manual treatment.

Additional objects of the invention are to provide improved circuits for the timing of cancellation printing at the proper instant on an envelope being fed through a canceling machine, whether the stamps are arranged adjacent the leading edge or the trailing edge of the envelope, and further to control the timing of the printing operation by a sensing of the said adjacent edge as it passes a predetermined location.

Additional objects, features and advantages will appear hereinafter as the description proceeds.

For purposes of illustration and explanation, the invention is shown in detail in its preferred form in the accompanying drawings, wherein:

FIG. 5 is a top plan of an improved stamp sensing head according to the invention, with the casing broken away to show the interior parts;

FIG. 6 is a vertical section taken substantially on line 6—6 of FIG. 5 and includes a stamped letter in a sensing position relative to the sensing head;

FIG. 7 is a vertical section taken substantially on line 7—7 of FIG. 5;

FIG. 8 is a detail section of the light channels taken substantially on line 8—8 of FIG. 7;

FIG. 9 is a perspective view showing a piece of mail (letter) with stamp on the lower trailing end thereof and moving in the direction of the arrow past the scanning elements, the latter being schematically shown;

FIG. 10 is a plan view of the elements shown in FIG. 9, with directional lines to indicate the reflection of light from the surface of the letter through conduits to photocells; and FIG. 11 shows a plan view of a specific type of mail canceling and facing machine with which the features of this invention are incorporated.

Figure 1:
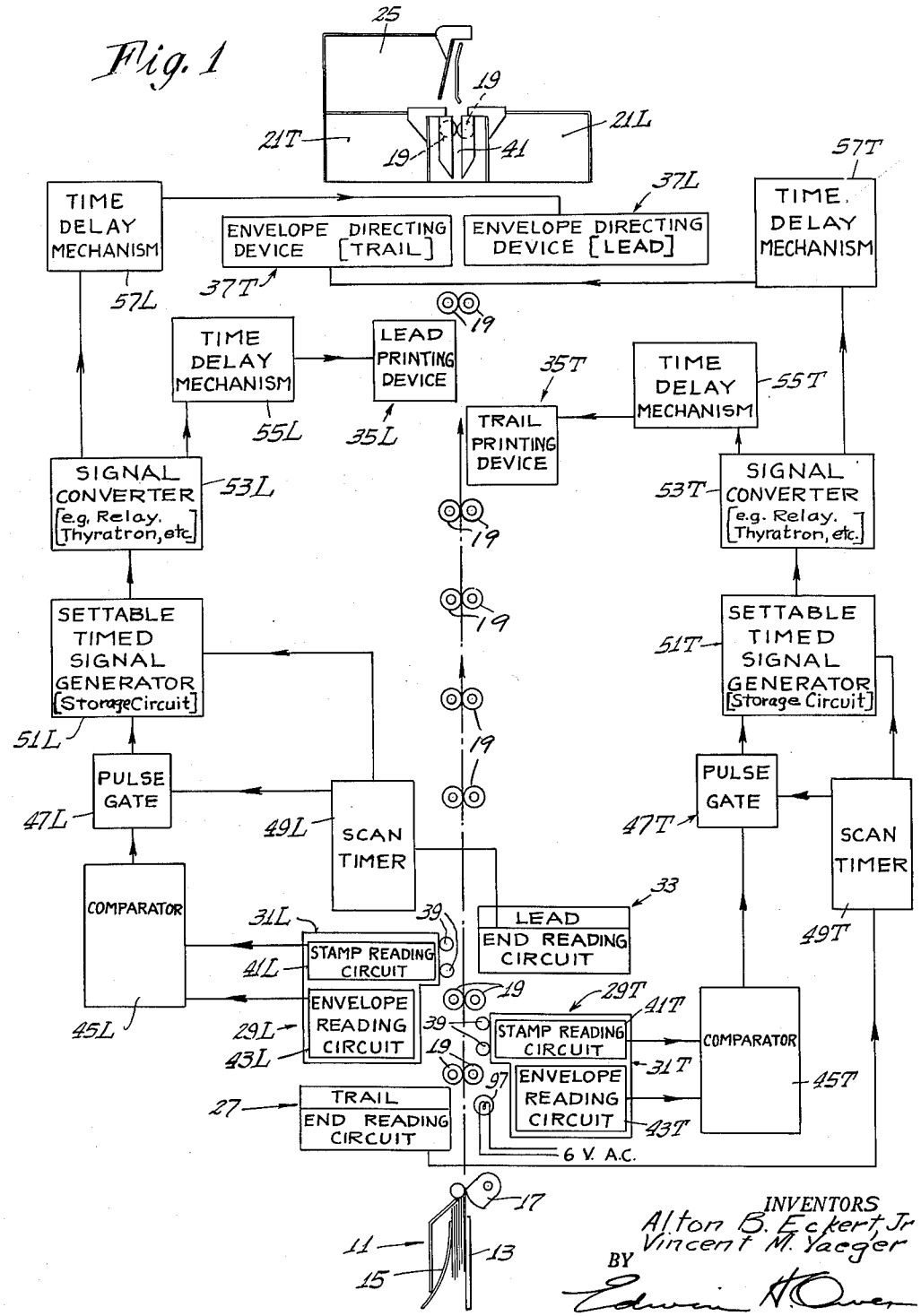
FIG. 1 is a schematic block diagram of an envelope canceling and facing machine according to the present invention.

Referring to the drawings the invention is shown embodied in a machine illustrated in FIG. 11 and diagrammatically in FIG. 1. At the entrance end of the machine is provided a hopper 11 into which stacks of envelopes or letters E may be inserted in a vertical, on-edge position. One wall 13 of the hopper is a guide wall, and a spring finger 15 serves to urge the contained envelopes against this wall. Any suitable means is provided for feeding the envelopes, one at a time, from the hopper 11. For the purposes of this description the feeding arrangement is represented by the friction feeding element or sector 17 which is preferably uniformly rotated and periodically picks the endmost envelope E from the stack in the hopper 11 and feeds it forward at a constant rate with its leading end spaced a given distance from the leading end of the envelope immediately preceding.

As an envelope is moved forward by the feeding element 17 it is picked up by the first of a series of constantly rotating feed rollers 19 which operate in pairs in time with the feed element 17 to pass the envelope from one to the other, carrying it the length of the machine and ultimately into one of three stackers 21T, 21L and 25.

In its progress along the envelope path defined by feed rollers 19, an envelope E passes adjacent firstly a trail end reading device 27, secondly a trail stamp reading device 29T, at the right hand side of the path, looking from the hopper towards the stackers, thirdly a lead stamp reading device 29L at the left hand side of the path, fourthly a lead end reading device 33, fifthly a stamp canceling printer 35T for operating on the right side of the envelope, and sixthly a stamp canceling printer 35L for operating on the left side of the envelope. Envelope directing devices 37T and 37L which may be, for example, swingable gates, then serve to guide the envelope into either one or the other of stackers 21T and 21L, or into a central channel 41 which leads to stacker 25 via the last pair of feed rollers 19.

The printing devices 35T and 35L, and the envelope directing devices 37T and 37L are supplied with latent power in electrical or mechanical form by any suitable means (not shown) but are normally inhibited from operating until an appropriate signal is given to cause them to take effect at the proper instant on a passing envelope.

The mechanism shown is designed to handle envelopes regardless of their orientation, to cancel those which are in either of two cancelable positions and to pass the others on through without canceling. The canceled envelopes are automatically fed and collected at separate points in accordance with their direction of facing, and those which are not canceled are collected at still another point so that they can be inverted to cancelable position and run through again. This is particularly illustrated in FIGS. 3 and 4.

Figure 3:
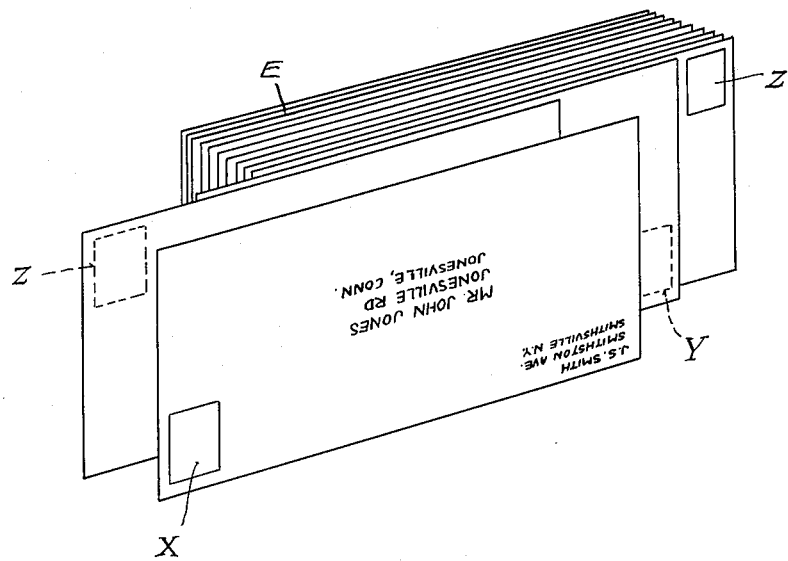
FIG. 3 is a perspective view of a group of envelopes arranged in random orientation ready for feeding to the device of the invention.

FIG. 3 shows a stack of envelopes E as picked up at random by the operator and straightened ready for insertion in the hopper 11. The stamps which are along the lower edges are the only ones which will be sensed and canceled. A stamp, as shown at X on the nearer face is in a "lead" position if the left hand end of the stack is presented to the feed mechanism. A stamp as shown at Y on the remote face is then in a "trail" position. Stamps near the upper edges as shown at Z, Z will not be sensed or canceled.

Figure 4:
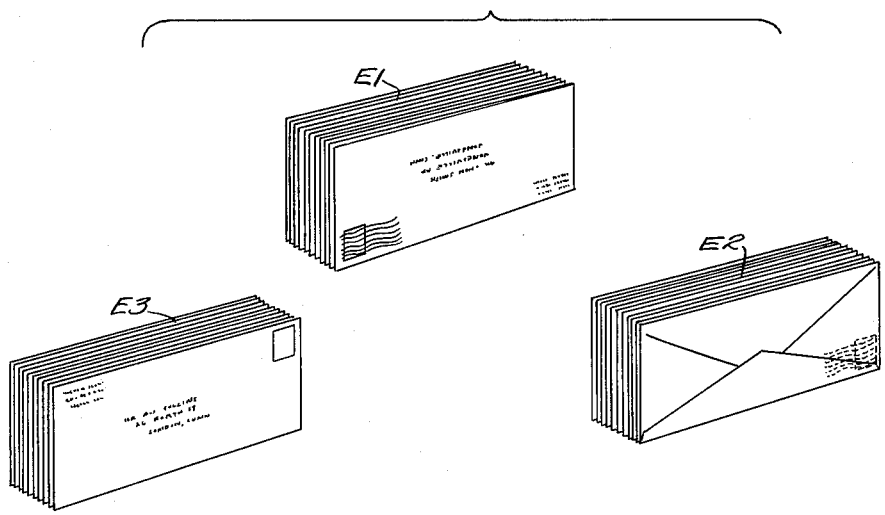
FIG. 4 is a perspective view showing the three groups in the arrangement of the envelopes after running the group of FIG. 3 once through the machine of the invention.

FIG. 4 shows the envelopes E in final position as they would appear in the stackers after running once through the machine. The upper group E1 is made up of all the envelopes with lead stamps canceled and faced in one direction. The right hand group E2 is made up of all the envelopes with trail stamps canceled and faced in one direction. The left hand group E3 is made up of all envelopes having their stamps adjacent the upper edges, on which no stamp was sensed, or which are irregular for some other reason such as having an excessively long series of stamps which cannot be handled by the machine's printing die. If the left hand group E3 is inverted and run through the machine again, all of the envelopes, except irregulars will then be found in one or the other of the groups E1 and E2. Thus substantially all of the mail will be canceled and faced if groups E1 and E2 are combined, after turning one of the groups end-for-end.

It will be found that in connection with the present invention the mechanism and operation thereof for working on envelopes with stamps in lead position (i.e. the lead system) is very similar to that for working on envelopes with stamps in trail position (i.e. the trail system). Accordingly to avoid redundancy, the lead system will be described first in detail, with the minor differences between the two systems then specifically pointed out.

*Lead system (general)*

The lead system includes, firstly, the lead stamp reading device 29L which includes a housing 31L, illumination source 39 mounted on the exterior of the housing 31L, and embodies a photoelectric stamp reading circuit 41L and a photoelectric envelope reading circuit 43L. The illumination from means 39 is reflected from the surface of a passing envelope, as indicated in FIG. 10, and this reflected light is arranged to be sensed by the circuits 41L and 43L. These are positioned and designed to accept reflected light from respective areas of the envelope where (1) a stamp S, FIG. 6, will normally be found and (2) a stamp will normally not be found. The details of stamp reading device 29L will be discussed at length hereinafter in connection with FIGS. 5 to 8.

The outputs of the reading circuits 41L and 43L are introduced into an electronic comparator 45L which is capable of comparing the strength of the signals, and which will send out a pulsed signal if there is any difference between the two received signals. The output of the coparator is fed to a pulse gate 47L which, when open, is capable of passing a pulsed signal.

At the opposite side of the envelope path and normally illuminated by the source 39 is the photoelectric lead end reading circuit 33. When the leading end of the envelope enters between the illumination source 39 and the circuit 33, it causes the latter to send out a pulse which is fed to and starts the operation of a scan timer 49L which has two outputs. One of the outputs is fed to the pulse gate 47L and acts to open the gate with the initiation of the predetermined scan time interval which is a characteristic of the timer 49L, and to close the same at the end of said interval. Thus if any signal is emitted by the comparator 45L during the predetermined scan time interval, it is permitted to pass the gate 47L and proceed to the settable timed signal general 51L, which takes the form of a storage circuit. The signal thus passed operates to set the storage circuit 51L so that it is in condition to preparedness to be reset by a pulse applied to its other input. This other input is fed by the second output of the scan timer 49L, and a pulse of energy is produced thereby slightly after the termination of the characteristic predetermined scan time interval, which pulse serves to reset the storage circuit if the same has previously been set. The resetting of the storage circuit 51L generates a signal pulse which is fed to the converter 53L to bring about operation of the devices 35L and 37L so that they will operate on the envelope as it passes them. The signal converter 53L emits a more powerful signal such as a substantial mechanical motion or an institution of flow of electrical current in substantial amounts, and may be a relay arrangement such as a thyratron circuit or the like, but its specific nature is not important and forms no part of the present invention. The signal converter 53L initiates operation of suitable time delay mechanisms 55L and 57L, the former cooperating with the lead printing device 35L and the latter with the directing device 37L for envelopes with stamps in leading position. The time delay characteristic of the mechanism 55L is arranged to correspond with the envelope feeding speed and is such as to initiate operation of the printer 35L just as the stamp on the envelope reaches canceling position, and the time delay characteristic of the mechanism 57L is likewise arranged to correspond with the envelope feeding speed and is such as to initiate operation of the envelope director 37L just the envelope reaches the director's field of influence and to guide it into the stacker 21L. In the case of the printer 35L timing operation is seen to be related to the tripping by the envelope of the lead end reading circuit 33 and the feeding speed, and hence may be accurately adjusted to bring about operation of its respective device when the envelope is in the precise position desired. In the case of the directing device 37L, the time delay mechanism 57L is such that the timing operation is related to the initial feed mechanism 17 by means of gearing (not shown). As in the case of the signal converter, the specific features of the time delay mechanisms, whether electrical or mechanical, and of the printing and directing devices, may vary substantially and form no part of the present invention.

Figure 2:
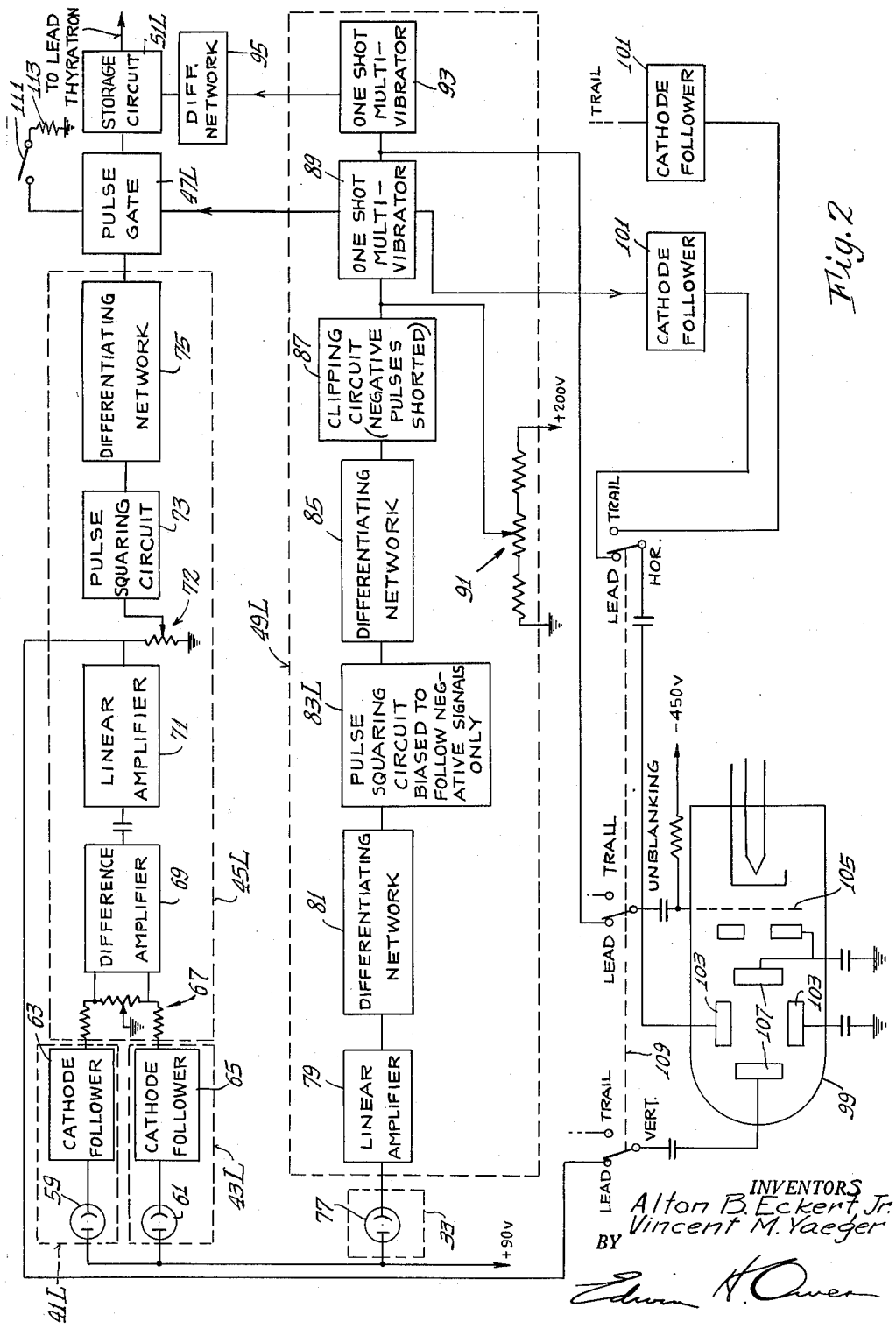
FIG. 2 is a more detailed block diagram of one portion of the device of FIG. 1, showing certain parts thereof broken down into standard commercial components and commonly used circuit elements, and further illustrating the connection of the same to a performance analyzing cathode ray oscilloscope.

In FIG. 2 portions of the lead system are broken down into components for more detailed description as follows.

Lead system reading circuits

The stamp reading circuit 41L and the envelope reading circuit 43L are seen to be made up of photocells 59 and 61 which feed cathode follower circuits 63 and 65 respectively whose outputs are fed to the comparator 45L.

Lead system comparator

The outputs of the reading circuits are connected with a difference amplifier 69 through a balancing potentiometer 67 which may be used for balancing the sensitivity of the reading circuits 41L and 43L. The difference amplifier 69 detects any inequality of the output of reading circuits 41L and 43L and amplifies the same, emitting a positive pulse signal whose length is determined by the duration of such inequality. This signal is further amplified by a linear amplifier 71, passed through an adjusting potentiometer 72 for controlling the over-all sensitivity of the comparator, and then shaped by a pulse squaring circuit 73. The signal is then differentiated by a network 75 to give two sharp pulses, the first positive and the second negative, corresponding to the leading and trailing ends of the squared difference pulse. These sharp pulses are the output of the comparator 45L, and since the sharp negative pulse coincides with the end of a difference signal, it corresponds to the trailing edge of a stamp carried by the envelope.

The trailing negative pulse is the only one of significance at this point, and the design of pulse gate 47L is such that only negative pulses can be passed therethrough while the gate is open. If and when such a sharp negative pulse does pass the pulse gate 47L, it acts on the storage circuit 51L to set the same so as to be ready for a resetting signal from the scan timer 49L.

Lead system scan timer

The scan timer 49L is fed by the lead end reading circuit 33 which consists esentially of a photocell 77. The output of the latter is amplified by a linear amplifier 79, differentiated by a differentiating network 81 and shaped by a pulse squaring circuit 83L biased to follow negative signals only. The output of the lead end reading circuit, as an envelope passes, is a long negative pulse so that the differentiated result is a sharp leading negative and a sharp following positive pulse, only the former of which is able to operate the biased squaring circuit. The output is tapped off the squaring circuit at a reversed polarity connection as a positive pulse which is fed to another differentiating network 85 which results in a sharply configured positive and negative pulse closely spaced in time. The negative pulse is shorted out in a suitable clipping circuit 87 and the output of the clipping circuit is fed to a one-shot multivibrator 89 having a predetermined time period for the emitted pulse, the length of which may be controlled by a potentiometer 91. The positive pulse allowed to pass through the clipping circuit 87 corresponds to the leading end of an envelope passing the reading device 33, and this pulse initiates operation of a multivibrator 89. The time duration of the pulse emitted by the latter is adjusted to correspond to a suitable length of envelope travel at standard envelope feeding speed, e.g. to about 2¾ inches of envelope travel, preferably. The physical location of the lead end reading circuit is such that the pulse emitted by the multivibrator 89 starts at a predetermined distance from the envelope edge to avoid scanning of any marginal coloring. The one-shot multivibrator output, in this instance via a connection giving a negative output pulse, controls the pulse gate 47L, which opens at the beginning of the multivibrator output signal pulse. While this pulse is maintained, the gate is held open, and it is caused to close at the termination of the pulse. Another output of the multivibrator 89, in this case via a connection giving a positive pulse, is used to trigger a second multivibrator 93 and the latter is connected so as to be triggered at the termination (in this instance the negative-going portion) of the signal emitted by multivibrator 89 to generate a signal terminating an extremely short time interval later than the closing of pulse gate 47L. This signal is differentiated by a differentiation circuit 95 (which may for convenience be physically included in the storage circuit element) and the sharply peaked result corresponding to the termination of the short signal from multivibrator 93, and is used to reset the storage circuit 51L in case the latter has been set by passage of a pulse through pulse gate 47L during its open period. The presence of the time delay introduced by the second multivibrator 93 avoids the possibility of confusion in the storage circuit 51L due to conflicting signals reaching the storage circuit simultaneously from different sources.

Trail system

The trail system is made up of substantially the same components as the lead system except in certain instances they are slightly different in physical position, adjustment, or electrical bias as will presently be explained, and the corresponding parts are designated by the same numerals, but, where necessary, with a postscript T.

The stamp reading device 29T is substantially identical with the device 29L, but is so placed that it is able to illuminate and view the right hand surface of the envelopes looking from the hopper 11 along the envelope path towards the stackers.

In this case the end reading circuit 27 is designed to sense and send out a signal designating the trailing end of the envelope instead of the leading end, and is placed at an earlier position in the envelope path. The position is selected so as to have the passing of the trailing end initiate a time period of the desired predetermined length, as heretofore mentioned for the lead system, whereby to pick up easily the first edge of a trailing stamp strip of the maximum length that can be handled when such a strip is placed normally on the envelope, and terminating in time to avoid scanning any marginal coloring such as air mail borders. Since this necessitates spacing the end reading device 27 well back of the stamp reading point it cannot receive sufficient illumination from lamps 39 of the stamp reading device 29T, but is separately illuminated by a suitable lamp 97.

In the trail system the difference signal pulse which is the output of a similar difference amplifier 69 and a linear amplifier 71 is also shaped in a pulse squaring circuit (not specifically shown) to give a square positive pulse. However, in this instance, by tapping off the pulse squaring circuit at a reversed polarity connection, the polarity of the output can be inverted, so that the squared output pulse is negative. This pulse is diffrentiated and gives a sharp leading negative pulse which indicates the beginning of a stamp detection and which is the significant one in this case. This pulse is likewise effective in the pulse gate 47T which, as before, is designed to pass, when open, only negative pulses. Likewise the storage circuit 51T is arranged to be set by such pulse if and when passed by the pulse gate 47T.

In the scan timer 49T, there is a pulse squaring circuit corresponding to circuit 83L and which, though not shown, may be considered 83T, in which the bias is such as to follow positive signals only. Thus the differentiated envelope signal, which is a sharp negative and a sharp positive pulse in that order, passes the squaring circuit as a positive pulse determining the instant of passage of the trailing end of the envelope.

Operation

The endmost envelope E of the stack in the hopper 11 is fed forward by the feed element 17. This envelope may, for the purposes of this description, be in any one of six conditions as follows, all directions being as viewed by an observer standing at the hopper and looking along the feed path:

(1) The envelope is facing left with the stamp at the bottom edge in leading position.

(2) The envelope is facing right with the stamp at the bottom edge in trailing position.

(3) The envelope has the stamps at its upper edge and may be facing in either direction.

(4) The same as condition 1 or 2, but the envelope is unstamped.

(5) The same as condition 1, except that the stamp row is too long to be properly canceled by the machine.

(6) The same as condition 2, except that the stamp row is too long to be properly canceled by the machine.

If the envelope is in condition 1, as it is fed forward, the leading end will be sensed by the end reading circuit 33 opening the pulse gate 47L and starting a scan time period running in the scan timer 49L. The stamp reading and envelope reading circuits 41L and 43L together with comparator 45L will detect the trailing edge of a stamp during this period and will send a pulse through the gate 47L to set the storage circuit 51L, which will be reset when the scan timer 49L completes its interval, emitting a signal to the signal converter 53L which compels the operation of the printing device 35L and the envelope directing device 37L (after the appropriate individual preset time delays) to cause canceling of the stamp and directing of the envelope into the lead stacker 21L. The trail system will not complete any operation since no stamp is detected on the face of the envelope which is exposed to the stamp reading device 29T.

When the envelope E about to be fed is in condition 2, the trailing end will be sensed by the end reading circuit 27 opening the pulse gate 47T and starting a scan time period running in the scan timer 49T. The stamp reading and envelope reading circuits 41T and 43T together with the comparator 45T will detect the leading edge of the stamp during this period and will send a pulse through the gate 47T to set the storage circuit 51T, which will be reset when the scan timer 49T completes its interval, emitting a signal to the signal converter 53T which compels the operation of the printing device 35T and the envelope directing device 37T (after the appropriate individual preset time delays) to cause canceling of the stamp and directing of the envelope into the trail stacker 21T. The lead system will not complete any operation since no stamp is detected on the face of the envelope which is exposed to the stamp reading device 29L.

If the next envelope to be fed is in condition 3 or 4, there is no stamp in a position which can affect either of the stamp reading circuits 41L or 41T. Accordingly, no pulse is sent through either pulse gate 47L or 47T, no operation of the printing or envelope directing mechanisms will occur, and the envelope is fed through, without canceling, between the stationary directing devices, directly into passage 41 and finally into the stacker 25.

If the next envelope to be fed is in condition 5, the stamp strip will be of such length that the pulse generated at its trailing edge will come after the pulse gate 47L has closed and hence the operation will be as if no stamp had been present as in condition 3 or 4.

If the next envelope to be fed is in condition 6, the stamp strip will project forwardly so far that the pulse generated at its leading edge will occur before the gate 47T has opened, and hence the operation will be as if no stamp had been present as in condition 3 or 4.

To face and cancel mail with the equipment described, then, the operator straightens a bundle of mail into a stack as it comes in without facing it. The stack is inserted in hopper 11 and run once through the machine. A certain proportion of the bundle will be found to have arrived at stacker 25. This portion is removed, turned with the upper edge down, and then run through again. Then in stacker 21T is found a stacked group of canceled letters with the stamps at the lower edges and all facing one direction. In stacker 21L is found another stacked group of canceled letters in which the stamps are at the lower edges and all facing in the opposite direction. By removing these groups and combining them after first turning one group end for end, the operation is substantially completed and yields the bundle of letters with stamps canceled and with all top edges in one direction and facing the same way. After the second run-through, a few abnormal letters, e.g. either unstamped or having excessively long stamp rows thereon, may be found in the stacker 25, in which case they would be given individual attention as by hand canceling or by transfer into a postage-due compartment.

When the operation for each feeding cycle has progressed to a point such that the signal has been transmitted to one of the thyratrons or other signal converter 53L or 53T for either the lead or trail system, it is preferable that operation of the other system be prevented for the balance of the feeding cycle. Various types of interlocks may be adopted in this connection depending upon the type of signal converter employed. However, it is presently preferred to provide a common biasing resistor in the cathode circuits for the thyratrons so arranged that when one thyratron is fired the bias voltage on the grid of the other will be instantly automatically increased to a point such that firing of the other is precluded until the first fired thyratron has been cut off by any suitable means late in the feeding cycle.

In order to monitor the operation of the equipment and provide for proper adjustment when needed, a small oscilloscope 99 is mounted at a suitable location on the machine. The oscilloscope 99 is shown in FIG. 2 in operative relation to the portions of the lead system circuitry wherein the sweep or horizontal scan is obtained from the timing wave form of the first one-shot multivibrator 89 via a cathode follower 101, which output is applied to the horizontal field electrodes 103. The period of unblanking is controlled by connecting to a positive-going output connector of the first one-shot multivibrator 89 via a cathode follower 101, which output is applied to the horizontal field electrodes 103. The period of unblanking is controlled by connecting to a positive-going output connector of the first one-shot multivibrator 89, the blanking grid 105 of the oscilloscope 99. The vertical deflection is brought about by applying to the vertical field electrodes 107 the output of the amplifier 71. Adjustment of the potentiometers 67, 72 and 91 to the proper values can be achieved by inspection of the oscilloscope trace as test envelopes are passed through the stamp reading area. In particular this provides for setting the sensitivity balance between the stamp reading circuit 41L and the envelope reading circuit 43L by using the potentiometer 67.

A three pole switch 109 is provided for switching the scope to make connection with the corresponding parts of the trail system and thereby provide for monitoring and adjusting the latter as well.

In case it is desired to use the machine as an ordinary canceling machine without taking advantage of the facing operation, there is provided a switch 111 which, when closed, connects a suitable point in the pulse gate circuit 47L with ground through a resistor 113. This has the effect of setting the pulse gate as if a stamp present signal were always being fed to it from the difference amplifier 69. Thus whenever the pulse gate is opened by the one-shot multivibrator 89, a signal automatically passes through to set the storage circuit 51L and a lead system canceling operation and directing of the envelope into the lead stacker 21L occurs each time an envelope is fed. If desired, another switch, mechanically or otherwise associated with the switch 111, may be employed to disable the trail system at any suitable point. The operator will then merely stack and face the envelopes with the stamps placed at the lower edge in leading position and feed them through for cancellation in the usual manner.

Stamp reading device

The present invention includes an improved optically sensitive stamp reading device or head more especially shown in FIGS. 5 to 10 which includes a casing 31 for mounting on the bed 115 of the machine. Within the housing is a mounting bracket 117 which carries the reading circuits consisting of photocells 59 and 61 and the respective cathode followers 63 and 65, FIG. 2, which preferably consist of two triodes in a single tube 119. The photocell 59 is placed in position to be horizontally in line with the midportion of a stamp at the lower edge of an envelope E guided along the upper surface of the bed 115, as shown in FIG. 6. The photocell 61 is positioned to be level with an area of the envelope just above such a stamp and one in which no stamp will ordinarily appear, to thereby take a reading of the reflectancy of the background. Tubular light conduits 121 and 123 are mounted in one wall of the housing 31 and each extends from a point spaced from an envelope being fed past the head, to a point near the illumination aperture of its respective photocell. See FIG. 10. By means of these conduits the diffused light which is reflected from the envelope or stamp surface perpendicularly is directed to the photocells, and the diffuse reflection is further enhanced by providing (1) a cellular arrangement of vertical baffles 125 in both tubes and (2) providing a dull black coating on the surface of all baffles and the interior of the tubes 121 and 123 to reduce direct reflections to a minimum. The accuracy of the readings are further improved by provding as a source of illumination, the fluorescent lamps 39 which provide a steady, diffuse illumination over the entire inspection area. By means of the cellular conduit specular reflection is eliminated.

Also it has been found that certain color filters 127 placed between the ends of the light conduit tubes and the photocells, with the same filtering medium used at both photocells for the same head, can produce a greater comparative reflectance and hence greater accuracy in the equipment than when used without the filter.

While in order to comply with the statute the invention is described in language which is rather specific as to structural features and arrangements, it is to be understood that the invention is not limited to the specific details shown, but that the means and method herein disclosed comprises the preferred of several modes of putting the invention into effect, and the invention is therefore claimed in any of its forms or modifications within the scope of the language employed in the appended claims.

What is claimed is:

1. A device for working in one way on an article fed past an inspection station in case a designator is found on a portion of the article, and for working thereon in another way in case the designator is not so found, which comprises means at said station for photoelectrically sensing the value of the reflectivity of the portion to be tested for the presence of a designator as the article is moved past said means and generating a first value signal; means for simultaneously photoelectrically sensing the value of the reflectivity of a background area of the article and generating a second value signal; means for comparing the values of said signals and for generating a third signal in response to a material difference between said first and second signals; and means for working on the article in one way in response to production of said third signal, and for working on the article in another way when said article passes said inspection station in the absence of said third signal.

2. A device for working in one way on an article fed at a uniform rate past an inspection station in case a designator is found on the article within a predetermined portion of its length, and for working thereon in another way in case the designator is not so found, which comprises means at said station for photoelectrically sensing the value of the reflectivity of an area of the article to be tested for the presence of a designator as the article is moved past said means and generating a first value signal; means for simultaneously photoelectrically sensing the value of the reflectivity of a background area of the article and generating a second value signal; means for comparing the values of said signals and for generating a third signal in response to a material difference between said first and second signals; gate means controlling passage of said third signal; timing means controlling said gate means to provide for passage of said third signal during a time period corresponding to the passage of said predetermined length portion past said inspection station at said uniform speed, and for causing said gate means to otherwise block said third signal; and means for working on the article in one way in response to passage of said third signal by said gate means, and for working on the article in another way when said article passes said inspection station in the absence of passage of said third signal by said gate means.

3. A device for working in one way on an article fed at a uniform rate past an inspection station in case a designator is found on the article within a predetermined portion of its length, and for working thereon in another way in case the designator is not so found, which comprises means at said station for photoelectrically sensing the value of the reflectivity of an area of the article to be tested for the presence of a designator as the article is moved past said means and generating a first value signal; means for simultaneously photoelectrically sensing the value of the reflectivity of a background area of the article and generating a second value signal; means for comparing the values of said signals and for generating a third signal in response to a material difference between said first and second signals; gate means controlling passage of said third signal; timing means, including a photoelectric detection device sensing passage of an end of the article, for controlling said gate means to provide for passage of said third signal during a time period corresponding to the passage of said predetermined length portion past said inspection station at said uniform speed, and for otherwise causing said gate means to block said third signal; and means for working on the article in one way in response to passage of said third signal by said gate means, and for working on the article in another way when said article passes said inspection station in the absence of passage of said third signal by said gate means.

4. A device for canceling and collecting at one point stamped letter mail pieces fed past an inspection station in case a stamp is found on one portion of the piece and for directing the piece to another collection point in case the stamp is not so found, which comprises means at said station for photoelectrically sensing the value of the reflectivity of the area of the piece to be tested for the presence of a stamp as the piece is moved past said means and generating a first value signal; means for simultaneously photoelectrically sensing the value of the reflectivity of a background area of the piece and generating a second value signal; means for comparing the values of said signals and for generating a third signal in response to a material difference between said first and second signals; and means for canceling the stamp and directing the piece in one way in response to production of said third signal, and for withholding cancellation and directing the piece in another way when said piece passes the inspection station in the absence of said third signal.

5. A device for canceling a stamp on a piece of letter mail fed past an inspection station on whichever side of the piece the stamp is found, which comprises an inspection head on each side of the mailpiece feed path, each of which includes means at said station for photoelectrically sensing the value of the reflectivity of the portion on one face of the piece to be tested for the presence of a stamp as the piece is moved past said means, and generating a first value signal; means for simultaneously photoelectrically sensing the value of the reflectivity of a background area of the same face of the piece and generating a second value signal; means associated with each head for comparing the values of said signals and for generating a third signal in response to a material difference between said first and second signals; means for canceling the stamp on one surface in response to production of said third signal by the comparison means for one head; and means for canceling the stamp on the other surface in response to production of said third signal by the comparison means for the other head.

6. A device for canceling stamped letter mail pieces fed at a uniform rate past an inspection station, which comprises means at said station for photoelectrically sensing the value of the reflectivity of an area of each piece to be tested for the presence of a stamp as the piece is moved past said means and generating a first value signal; means for simultaneously photoelectrically sensing the value of the reflectivity of a background area of the piece and generating a second value signal; means for comparing the values of said signals and for assuming a stamp present condition in response to a material difference between said first and second signals and a stamp absent condition otherwise; means for generating a third signal in response to a change from a predetermined one of said conditions to the other; gate means controlling passage of said third signal; timing means controlling said gate means to provide for passage of said third signal during a time period corresponding to the passage of said predetermined length portion past said inspection station at said uniform speed, and for otherwise causing said gate means to block said third signal; and means for canceling the stamp in response to passage of said third signal by said gate means, and for withholding cancellation when the piece passes said inspection station in the absence of passage of said third signal by said gate means.

7. A device for canceling stamped letter mail pieces fed at a uniform rate past an inspection station, which comprises means at said station for photoelectrically sensing the value of the reflectivity of an area of each piece to be tested for the presence of a stamp as the piece is moved past said means and generating a first value signal; means for simultaneously photoelectrically sensing the value of the reflectivity of a background area of the article and generating a second value signal; means for comparing the values of said signals and for assuming a stamp present condition in response to a material difference between said first and second signals and a stamp absent condition otherwise; means for generating a third signal in response to a change from a predetermined one of said conditions to the other; gate means controlling passage of said third signal; timing means, including a photoelectric detection device sensing passage of an end of the piece, for controlling said gate means to provide for passage of said third signal during a time period corresponding to the passage of said predetermined length portion past said inspection station at said uniform speed, and for otherwise causing said gate means to block said third signal; and means for canceling the stamp in response to passage of said third signal by said gate means, and for withholding cancellation when the piece passes said inspection station in the absence of passage of said third signal by said gate means.

References Cited in the file of this patent

UNITED STATES PATENTS

| | | |
|---|---|---|
| 1,217,092 | Hopp | Feb. 20, 1917 |
| 1,228,460 | Mack | June 5, 1917 |
| 1,729,521 | Roddy | Sept. 24, 1929 |
| 1,978,589 | McFarlane | Oct. 30, 1934 |
| 2,719,629 | Robinson | Oct. 4, 1955 |

FOREIGN PATENTS

| | | |
|---|---|---|
| 675,556 | Great Britain | July 16, 1952 |